April 14, 1936.  J. EGGERT ET AL  2,037,314

PRINTING PART COLOR PICTURE

Filed March 17, 1934    2 Sheets-Sheet 1

Inventors:
John Eggert,
Gerd Heymer,
by Potter, Pierce & Scheffler,
Attorneys.

April 14, 1936.  J. EGGERT ET AL  2,037,314

PRINTING PART COLOR PICTURE

Filed March 17, 1934  2 Sheets-Sheet 2

Inventors:
John Eggert,
Gerd Heymer,
by Potter, Pierce & Scheffler,
Attorneys.

Patented Apr. 14, 1936

2,037,314

UNITED STATES PATENT OFFICE 2,037,314

PRINTING PART COLOR PICTURE

John Eggert, Leipzig-Gohlis, and Gerd Heymer, Wolfen Kreis, Bitterfeld, Germany, assignors to I. G. Farbenindustrie Aktiengesellschaft, Frankfort-on-fhe-Main, Germany Application March 17, 1934, Serial No. 716,139
In Germany March 18, 1933

6 Claims. (Cl. 95—75)

Our present invention relates to printing part color pictures and more particularly to printing part color pictures recorded on smooth film on to lenticular film.

Figure 1:
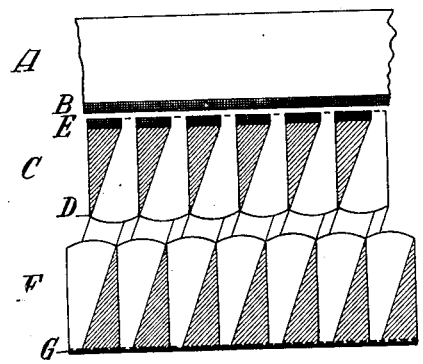
Figure 2:
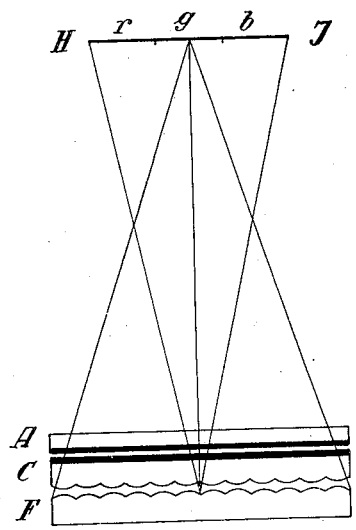
Figures 3, 4:
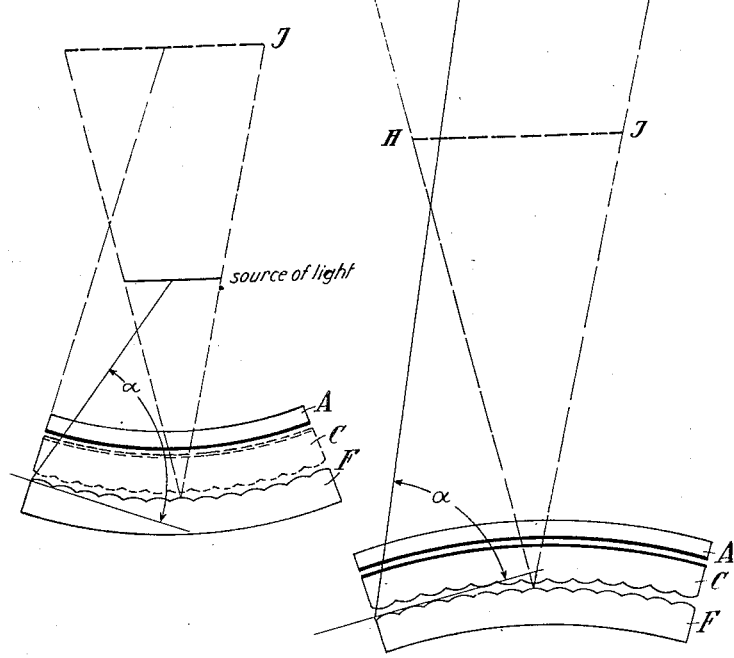

One of its objects is an improved process for printing part color pictures recorded on smooth film on to lenticular film. Another object is an arrangement for such printing. Further objects will be seen from the detailed specification following hereafter. Reference is made to the accompanying drawings in which Fig. 1 shows the arrangement of the films for printing according to this invention, Fig. 2 shows the relation between the arrangement of films and the source of light and Figs. 3 and 4 show printing according to this invention if the source of light shall have in printing a distance different from that of the projection filter or its virtual image from the film in reproduction.

It has already been proposed to print partial color pictures taken on smooth film on to a lenticular film in contact therewith by light which passes first through the partial color picture, the source of light being arranged at a definite distance from the lenticulation of the lenticular film; this distance is also that of the color filter from the film, during the reproduction. The reproduction of colors from the lenticular print produced according to the said method depends on the sharpness with which the source of light is copied as a thin luminous strip under each lenticular element. If the partial color picture is a very turbid silver picture it is impossible to copy the source of light in the required sharpness under the several lenticular elements.

According to this invention partial color pictures may be printed in contact on a lenticular film with the desired sharpness by arranging the partial color picture in contact with the emulsion side of a "stencil film" produced in accordance with the conditions under which that part color picture is to be projected, arranging the lenticular film in contact with the goffered side of the "stencil film" and exposing the combination to light through the partial color picture. The source of light for printing is arranged at the same distance from the print as shall have the multi-color filter in projection; the lateral extension of the source of light must not correspond exactly with the breadth of the multicolor used in projection but may be, for instance, 20 per cent wider or narrower. If the distance of the source of light shall differ from that of the multi-color filter from the film in projection, for instance, for saving space, the films must be bent to a cylindrical plane, so that the line drawn from the green middle line to the margin of the film, that is to say the lines from the center of the source of light to the middle of the lenticular element of the margin of the film (if the central filter strip of the projection filter is the green strip) forms with the tangent to the border of the film the same angle as the green middle lines from the center of the projection filter forms with the print in reproduction.

The "stencil film" may be prepared in the following manner. A lenticular film is illuminated by means of a diffuse source of light equal in size to one color area of the multi-color filter to be used in projecting the lenticular print and arranged at the same distance from the light sensitive lenticular film and under the same angle with relation to the latter as the multi-color filter is arranged with relation to the lenticular film in projection. The exposed film is developed and the film thus obtained is printed on another lenticular film with the lenticular elements facing each other, there being used a source of diffuse light for illumination. The film which results after development is the "stencil film" required for printing the corresponding partial color picture. For each partial color picture there is used a different "stencil film". These "stencil films" are distinguished from one another by the position of the bright and dark zones relative to the main axis, the position of the bright zone being determined for each "stencil film" by the position of the projection filter strip corresponding in color with that of the part color picture to be printed. Therefore, according to the position of these bright and dark zones with relation to the main axis of the lenticular elements it is possible to reproduce the lenticular print prepared with the corresponding "stencil film", with a certain position and a certain size of the projection filter or of the virtual image thereof. The accompanying drawings show the arrangement of the films for the method of printing according to the present invention.

In Fig. 1A is the photographic material having a partial color picture in the layer B. C is the "stencil film" having lenticular elements D and a layer E comprising zones that are alternately transparent and opaque and extend parallel to the lenticular embossing. The position of these zones with regard to the main axis of the lenticular elements is characteristic for each partial color picture to be reproduced with the required position of the filter. The lenticular printing film F having the light-sensitive layer G is arranged in contact with the goffered face of the "stencil film".

In Fig. 2A is again the partial color picture, C is the "stencil film" and F is the lenticular printing film. HJ is the source of light being arranged at the same distance from the film as that which the projection filter or the virtual image thereof is to have from the lenticular print when this is to be projected and having a breadth about equal to that of the projection filter or its virtual image. The "stencil films" for printing the different part color pictures are prepared with the use of a source of light, for instance, an illuminated slotted diaphragm which corresponds as to position with relation to the film with the position and the size of the different color areas of the multi-color filter or their virtual images.

In Figs. 3 and 4 there are shown modifications in printing according to this invention in which the source of light is arranged at a distance from the printing film different from that which the multi-color filter or its virtual image is to have from the film in reproduction. In Fig. 3 there is shown the arrangment in case the source of light is nearer to the printing film and in Fig. 4 there is shown the arrangement in case the source of light is farther away from the printing film than the multi-color filter or its virtual image is to be from the print in reproduction. In both cases the film is bent to a cylindrical plane having such a curvature that the angle α between the line drawn from the center of the source of light to the margin of the film and the tangent drawn to the bent film at its border is the same as that between the line from the center of the muti-color filter or its virtual image to the border of the film and the plane of the film in reproduction of the film. HJ is in both Figs. 3 and 4 the source of light having a breadth equal to that shown in Fig. 2, and has been drawn for the sake of clearness inasmuch as the arrangement of the source of light and the printing film in Fig. 2 is the same in printing and reproduction, a fact which is suggested by dividing the source of light into the strips r (red), g (green) and b (blue) composing the projection filter.

What we claim is:

1. A process of printing part color picture recorded on smooth film on to lenticular film which comprises arranging a smooth film containing in its emulsion layer a part color picture, a "stencil film" having in its emulsion layer behind each lenticular element a blackened and a transparent strip which cause a direction of the light falling on the "stencil film" in a manner for the partial color picture to be printed and being adapted to the reproducing conditions of said part color picture, and a lenticular printing film in contact so that the emulsion layers of the smooth film and the "stencil film", and the lenticular sides of the "stencil film" and the printing film face each other, and projecting light on said films under the same angular conditions as exist between the print and the multi-color filter or its virtual image in reproduction.

2. A process of printing part color picture recorded on smooth film on to lenticular film which comprises arranging a smooth film containing in its emulsion layer a part color picture, a "stencil film" having in its emulsion layer behind each lenticular element a blackened and a transparent strip which cause a direction of the light falling on the "stencil film" in a manner for the partial color picture to be printed and being adapted to the reproducing conditions of said part color picture, and a lenticular printing film in contact so that the emulsion layers of the smooth film and the "stencil film" and the lenticular sides of the "stencil film" and the printing film face each other, and exposing said films by means of a source of light arranged at the same distance from the printing film as shall have the multi-color filter or its virtual image from the print in reproduction.

3. A process of printing part color picture recorded on smooth film on to lenticular film which comprises arranging a smooth film containing in its emulsion layer a part color picture, a "stencil film" having in its emulsion layer behind each lenticular element a blackened and a transparent strip which cause a direction of the light falling on the "stencil film" in a manner for the partial color picture to be printed and being adapted to the reproducing conditions of said part color picture, and a lenticular printing film in contact so that the emulsion layers of the smooth film and the "stencil film" and the lenticular sides of the "stencil film" and the printing film face each other, and bending the films to a cylindrical plane so that the line from the border of the printing film to the center of the source of light forms with the tangent in the border of the film the same angle as the line from the center of the multi-color filter or its virtual image to the border of the print with the print.

4. In combination, a smooth film containing in its emulsion layer a part color picture, a lenticular "stencil film" having in its emulsion layer behind each lenticular element a blackened and a transparent strip which cause a direction of the light falling on the "stencil film" in a manner for the partial color picture to be printed and being adapted to the reproducing conditions of said part color picture and a lenticular printing film arranged in contact, so that the emulsion layers of the smooth film and the "stencil film", and the lenticular sides of the "stencil film" and the printing film face each other, and a source of light arranged under the same angular conditions with respect to the printing film as those of the multi-color filter or its virtual image with respect to the print in reproduction.

5. In combination, a smooth film containing in its emulsion layer a part color picture, a lenticular "stencil film" having in its emulsion layer behind each lenticular element a blackened and a transparent strip which cause a direction of the light falling on the "stencil film" in a manner for the partial color picture to be printed and being adapted to the reproducing conditions of said part color picture and a lenticular printing film arranged in contact, so that the emulsion layers of the smooth film and the "stencil film", and the lenticular sides of the "stencil film" and the printing film face each other, and a source of light at the same distance from the printing film as the multi-color filter or its virtual image from the print in reproduction.

6. In combination, a smooth film containing in its emulsion layer a part color picture, a lenticular "stencil film" having in its emulsion layer behind each lenticular element a blackened and a transparent strip which cause a direction of the light falling on the "stencil film" in a manner for the partial color picture to be printed and being adapted to the reproducing conditions of said part color picture and a lenticular printing film arranged in contact, so that the emulsion layers of the smooth film and the "stencil film" and the lenticular sides of the "stencil film" and the printing film face each other, and a source of light arranged at a distance from the printing film differing from that of the multi-color filter or its virtual image from the print in reproduction, said films being bent to a cylindrical plane so that the tangent in the border of the printing film forms with the line from the center of the source of light the same angle as the line from the center of the multi-color filter or its virtual image to the border of the print with the print in reproduction.

JOHN EGGERT.
GERD HEYMER.